(12) United States Patent
Vosgueritchian et al.

(10) Patent No.: US 10,353,506 B2
(45) Date of Patent: Jul. 16, 2019

(54) DUAL RESISTIVE STRAIN AND PRESSURE SENSOR FOR FORCE TOUCH

(71) Applicant: Apple Inc., Cupertino, CA (US)

(72) Inventors: Michael Vosgueritchian, San Francisco, CA (US); Sinan Filiz, Sunnyvale, CA (US); James E. Pedder, Thame (GB); John Stephen Smith, San Jose, CA (US); Saahil Mehra, Saratoga, CA (US); Xiaofan Niu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/625,952

(22) Filed: Jun. 16, 2017

(65) Prior Publication Data

US 2018/0364850 A1     Dec. 20, 2018

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04105* (2013.01); *G06F 2203/04106* (2013.01)

(58) Field of Classification Search
USPC ........................................................ 345/174
See application file for complete search history.

(56) References Cited

U.S. PATENT DOCUMENTS

| | | |
|---|---|---|
| 6,504,530 B1 * | 1/2003 | Wilson ................ G06F 3/0418 345/173 |
| 7,152,482 B2 | 12/2006 | Ueno et al. |
| 7,698,084 B2 | 4/2010 | Soss |
| 8,144,271 B2 | 3/2012 | Han |
| 8,305,358 B2 | 11/2012 | Klinghult |
| 8,421,483 B2 | 4/2013 | Klinghult |
| 8,547,495 B2 | 10/2013 | Lee |
| 8,553,004 B2 | 10/2013 | Hotelling et al. |
| 8,560,947 B2 | 10/2013 | Gillespie et al. |
| 8,618,720 B2 | 12/2013 | Paleczny et al. |
| 8,629,841 B2 | 1/2014 | Degner et al. |
| 8,631,567 B2 | 1/2014 | Lee et al. |

(Continued)

FOREIGN PATENT DOCUMENTS

WO      WO 15/077200      5/2015

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Chineyere D Wills-Burns
(74) *Attorney, Agent, or Firm* — Brownstein Hyatt Farber Schreck, LLP

(57) ABSTRACT

Structures and methods are disclosed for an electronic device having an input surface that uses dual sensors to measure forces applied to the input surface. The forces can be estimated over a greater range of values than would be possible with either sensor alone. A second sensor can be used after a first sensor has reached a limit. A first sensor can be a strain sensor and a second sensor a pressure sensor. Both sensors may be resistance based, with signals from both sensors can be combined and measured by processing circuitry. Each sensor type may be part of planar arrays disposed beneath the input surface.

19 Claims, 18 Drawing Sheets

(56) References Cited

U.S. PATENT DOCUMENTS

| | | |
|---|---|---|
| 8,730,199 B2 | 5/2014 | Sleeman et al. |
| 8,743,060 B2 | 6/2014 | Hotelling |
| 8,878,811 B1 | 11/2014 | Baumbach |
| 8,970,507 B2 | 3/2015 | Holbein et al. |
| 8,988,384 B2 | 3/2015 | Krah et al. |
| 9,081,453 B2 | 7/2015 | Bulea et al. |
| 9,116,570 B2 | 8/2015 | Lee et al. |
| 9,164,605 B1 | 10/2015 | Pirogov et al. |
| 9,232,636 B2 | 1/2016 | Ozeki et al. |
| 9,348,472 B2 | 5/2016 | Kang |
| 9,454,268 B2 | 9/2016 | Badaye et al. |
| 9,519,857 B2 | 12/2016 | Ryhanen et al. |
| 9,612,690 B2 | 4/2017 | Zirkl et al. |
| 9,690,408 B1 | 6/2017 | Krah |
| 9,779,676 B2 | 10/2017 | Al-Dahle et al. |
| 9,874,965 B2* | 1/2018 | Pedder .................. G06F 3/0414 |
| 9,977,500 B2 | 5/2018 | Westerman et al. |
| 2007/0119698 A1* | 5/2007 | Day ........................ G06F 3/038 |
| | | 200/510 |
| 2009/0002199 A1 | 1/2009 | Lainonen et al. |
| 2009/0151475 A1* | 6/2009 | Masaki ................... G01L 1/146 |
| | | 73/862.68 |
| 2009/0165564 A1* | 7/2009 | Matsushima ......... G01L 1/2262 |
| | | 73/754 |
| 2009/0326833 A1 | 12/2009 | Ryhanen et al. |
| 2012/0086666 A1 | 4/2012 | Badaye et al. |
| 2012/0105367 A1 | 5/2012 | Son et al. |
| 2012/0318070 A1* | 12/2012 | Evans ..................... G01L 25/00 |
| | | 73/862.68 |
| 2013/0057499 A1* | 3/2013 | Ando ....................... G06F 3/038 |
| | | 345/173 |
| 2013/0082970 A1 | 4/2013 | Frey et al. |
| 2013/0096849 A1* | 4/2013 | Campbell ............. G06F 3/0414 |
| | | 702/42 |
| 2014/0055407 A1* | 2/2014 | Lee ........................ G06F 3/0416 |
| | | 345/174 |
| 2014/0098028 A1* | 4/2014 | Kwak ...................... G09G 5/00 |
| | | 345/173 |
| 2014/0204285 A1* | 7/2014 | Jang ........................ G06F 3/044 |
| | | 349/12 |
| 2014/0320436 A1* | 10/2014 | Modarres .............. G06F 3/0412 |
| | | 345/173 |
| 2015/0084909 A1 | 3/2015 | Worfolk et al. |
| 2015/0103038 A1 | 4/2015 | Han et al. |
| 2016/0062497 A1 | 3/2016 | Huppi et al. |
| 2016/0378223 A1 | 12/2016 | Hyuga et al. |
| 2017/0060290 A1 | 3/2017 | Chen et al. |
| 2017/0060292 A1 | 3/2017 | Chen et al. |
| 2017/0075465 A1* | 3/2017 | Pedder .................. G06F 3/0414 |
| 2017/0131840 A1* | 5/2017 | Deichmann ........... G06F 3/0412 |
| 2017/0285799 A1* | 10/2017 | Iuchi ..................... G06F 3/0414 |
| 2017/0285810 A1 | 10/2017 | Krah |
| 2017/0336902 A1 | 11/2017 | Smith |
| 2018/0025694 A1 | 1/2018 | Al-Dahle et al. |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

Min et al., "Adaptive Touch Sampling for Energy-Efficient Mobile Platforms," Intel Corporation, Hillsboro, OR 97124, 4 pages.

* cited by examiner

DUAL RESISTIVE STRAIN AND PRESSURE SENSOR FOR FORCE TOUCH

FIELD

The described embodiments relate generally to devices, components and methods for the detection and measurement of forces applied to surfaces, such as may be used on portable or other electronic devices. More particularly, the present embodiments relate to devices, structures and methods that use two types of sensors to detect a greater range of forces applied to an input surface than could be detected by either sensor individually.

BACKGROUND

Many electronic devices, such as smart phones, laptop or tablet computers, kiosks, among many others, have a display that also functions as a touch sensitive input surface. A user can apply a localized input force, either with a finger, stylus or other means, to the input surface to effect an actuation, such as of a selection from a menu, or to alter the electronic device's operation. The applied input force is often detected or measured by the electronic device by means of one or more sensors positioned beneath the input surface (i.e., opposite to the exterior side of the input surface that faces the user).

Strain sensors are one type of sensor sometimes used to detect the applied input force. These function by detecting a strain (i.e., a displacement) in either the input surface or a structural layer connected to the input surface. However, to decrease the weight and thickness of the electronic device, its internal components are often placed very close together. If in addition the size of the display is increased, its input surface may show greater compliance or ability to bend. If the input surface or its structural layers bend or deflect too much they may contact other internal components, such as a rigid battery, and be unable to deflect further. In such situations, a strain sensor may not be able to provide reliable values of the applied input force. It may nevertheless be useful for the electronic device to be able to detect a greater range of applied input forces. The embodiments disclosed herein are directed to overcoming this and other limitations.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

One embodiment disclosed is of an electronic device that has an input layer with an input surface to which a user can apply a force to provide an input to the electronic device. The input layer may contain one or more layers that perform various actions, such as a display layer, a stiffener layer, or a lighting layer, among other possible layers. To detect the applied force, the electronic device contains a force-sensing stack that is coupled to the input layer. The force-sensing stack itself may include one or more layers. The force-sensing stack includes a strain sensor that can be used to estimate the applied force by measuring a displacement in a material caused by the applied force. The force-sensing stack also includes a pressure sensor that can also be used to estimate the applied force. Such a pressure sensor may work by detecting either changes in a capacitance or a resistance caused by the applied force, or by other methods.

The electronic device also has one or more additional components positioned below the force-sensing stack. Examples of such include a battery, an integrated circuit, and a circuit board, among others. Because the input surface will deflect with the applied force, the electronic device also is configured with a compressible gap between the input surface and the one or more additional components to allow for the deflection.

The electronic device also has processing circuitry configured to receive signals from the strain sensor and pressure sensor and from them estimate the applied force. The processing circuitry can first determine whether the deflection of the input surface has caused the compressible gap to be compressed by using the strain and/or pressure signals. If the compressible gap has not been compressed, the processing circuitry operates in at least a partial strain-sensing mode (e.g., the strain signal is used. either by itself or as one of multiple signals in a weighted value, to determine a force input). This can happen, for example, when further deflection of the input surface is possible and the strain sensor can continue to produce a reliable or useful signal corresponding to further increases in applied force. However, when the compressible gap is compressed, the input surface, its attached layers, or the force-sensing stack may not be able to be deflected further, so that the strain sensor's signal may not be useful for estimating the applied force. In this event, the processing circuitry operates in at least a partial pressure-sensing mode, in which the pressure sensor's signal may be used (either alone or as part of a weighted value) by the processing circuitry to estimate the applied force. The pressure sensor may be capacitance-based or resistance-based, or be based on another parameter.

These elements of the electronic device may be configured in various ways. In one configuration the pressure sensor is positioned below the strain sensor, while in another configuration the pressure sensor and the strain sensor are positioned in a one horizontal layer. In another configuration the compressible gap is between the force-sensing stack and the additional component(s). Alternatively, the compressible gap may be located between the strain sensor and the pressure sensor when the pressure sensor is below the strain sensor. In one embodiment of this configuration the pressure sensor may be positioned on the additional component.

Also disclosed is a second electronic device that has a cover sheet whose outer surface is an input surface for the electronic device. This electronic device has a first sensor and a second sensor coupled to the input surface. This electronic device also has processing circuitry connected to both the first and the second sensors, and can receive respective signals from them.

The processing circuitry determines whether the signal from the second sensor is within a first range of values or in a second range of values. In the former case the processing circuitry uses the signal from the first sensor to estimate the force applied to the input surface. In the latter case the processing circuitry uses the signal from the second sensor to estimate the force applied to the input surface.

This second electronic device may further operate so that the processing circuitry determines whether the signal from the second sensor is within a third range of values. If so, the processing circuitry uses a weighted sum of the signal from the first sensor and the signal from the second sensor to estimate the force applied to the input surface.

The second electronic device may use a resistance-based strain sensor as the first sensor and a resistance-based pressure sensor as the second sensor. In some cases the resistance-based pressure sensor is configured to have a current conductive material between two electrodes so that the conductivity increases as the force applied to the input surface increases.

The second electronic device may be configured so that the first sensor and the second sensor are in a common substrate. Alternatively, the second sensor may be positioned below the first sensor.

The second sensor may be determined to be in the first range of values when its signal is in a quiescent state. In the case of a resistance-based pressure sensor, such a quiescent state may be when the resistance makes it effectively an open circuit.

In another embodiment, a method is disclosed for estimating a force applied to an input surface of an electronic device. In the method, processing circuitry of the electronic device receives a first signal from a strain sensor and a second signal from a pressure sensor. The second signal from the pressure sensor is used by the processing circuitry to determine if a deflection of the input surface has exceeded a threshold. If not, then the first signal of the strain sensor is used to estimate the force applied to the input surface. If so, the second signal of the pressure sensor is used to estimate the force applied to the input surface. The first signal from the first sensor may also be used in this event. The first signal can be based on a change in resistance within the strain sensor, and the second signal can be based on a change in resistance within the pressure sensor. These resistance values may be determined by a Wheatstone or other bridge structure that is part of the processing circuitry.

While the specific embodiments just disclosed discuss electronic devices having a first sensor and a second sensor, one of skill in the art will recognize that such sensors can each be part of arrays of such sensors to detect forces at various locations across the input surfaces.

BRIEF DESCRIPTION OF THE DRAWINGS

The disclosure will be readily understood by the following detailed description in conjunction with the accompanying drawings, wherein like reference numerals designate like elements.

Figure 1:
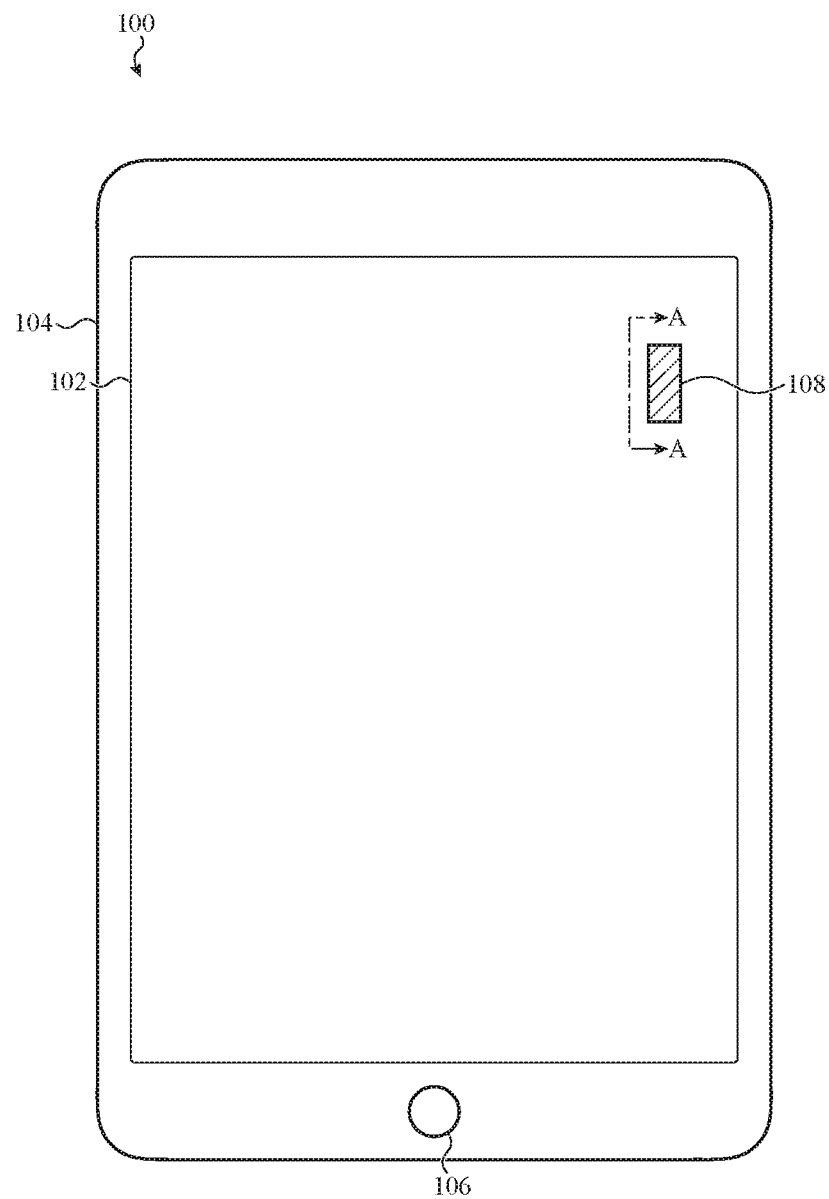
FIG. 1 shows an exemplary electronic device that may use dual force sensors.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to sensing forces applied to surfaces, in particular to display surfaces or input surfaces of electronic devices. Determining a force applied to an input surface may determine which particular user input is intended, and so alter how the electronic device is performing, e.g., accepting an input, changing the display, or a running application. As an example, a soft force could imply entry of a lower case letter, and a strong force could indicate a capital letter.

A design goal for many electronic devices, especially portable ones, is to have a small form factor, such as thickness. This goal requires placing components of the electronic device as close together as possible. Touch-based electronic devices have user interface displays with input surfaces that users press with a finger, stylus, or other means to apply a force to cause an input. Often this applied force is detected by strain sensors, which detect the applied force by sensing a strain (displacement) in a deformable object or surface. But such deflection of an input surface may cause the input surface, or related support structures, to deflect and contact other components of the electronic device. To prevent this, a gap between the components and the input surface may be part of the design.

Nevertheless, a large force applied to the input surface may cause it to deflect sufficiently to contact other components. This problem is more acute for electronic devices having large user interface displays, as the input surface, such as a cover glass, will have a greater ability to bend or deflect. Further, a battery positioned beneath the display may expand during use, and so reduce the size of a gap between it and the display. Consequently, a large enough input force on the input surface could cause the display structure to contact another component, stopping further deflection of the input surface. In this case readings from a strain sensor will flatten out, or be otherwise unreliable, and no longer correlate with the amount of input force applied. Overcoming this problem by increasing the gap or using a thicker and stiffer input surface conflicts with the design goal of a small form factor, as well as introduces extra costs.

Some of the embodiments disclosed herein are directed to other solution approaches that make use of two or more sensors for detecting forces on an input surface. These embodiments use signals from each of two sensors and determine which signal to use to estimate the force applied to the input surface. The detection may deduce that the deflection of the input surface is such that a first sensor may not be producing a signal that correlates with the applied force. This may occur either as just described when the display and input surface are deflected enough to impinge on another component, or when it is determined that the first sensor has exceeded a design limit. When detection indicates the first sensor is not usable, these embodiments use a signal from a second sensor that is reliable. An additional advantage of dual sensors is to extend the range of values of input force that can be reliably detected beyond the range of either sensor used individually.

In some of the embodiments the dual sensors are a strain sensor and a pressure sensor. The pressure sensor may still provide a valid signal once a display is deflected so far that the strain sensor's signal is not reliable. As described further below, a pressure sensor may be capacitance-based or resistance-based.

In some embodiments, a first set of sensors may be coupled to the input surface to measure a range of displacement of the input surface; a second set of sensors may decoupled from the input surface over a first part of that range, and coupled to (or otherwise engage) the input surface over a second part of that range. This may reduce the likelihood of receiving poor or unreliable sensor data when the input surface flexes, moves, or otherwise displaces across the second part of the range, insofar as the second set of sensors may be configured to provide reliable output when the input surface deflects sufficiently to end the second part of the range.

As one example of such an embodiment, the first set of sensors can be strain sensors coupled to the input surface. The second set of sensors can be capacitive sensors, such as parallel plates with a dielectric between them or a foam pad. Over the first part of the displacement of the input surface (the "displacement range"), the input surface and the capacitive sensors may be separated by an air gap. Once the displacement reduces the air gap to zero or is sufficiently small that the capacitive sensor registers changes in capacitance (e.g., the second part of the displacement range is entered by the input surface), the capacitive sensor can thereafter provide a reliable signal that correlates with further displacements of the input surface. In such cases, when the capacitive sensors detect the displacement, the strain sensors' signals may become invalid or otherwise inaccurate, since their outputs may represent both user-applied force on the input surface and forces arising from contact of the input surface with the back of the electronic device.

In some embodiments, a first set of sensors may be sensitive to bending or differential forces between the input surface and the back of the sensor stack. The second set of sensors may functionally measure forces incident on the electronic device from a side opposite the input surface. The forces detected by the second sensors thus can be used to adjust or compensate forces detected by the first sensors. For example, the effect of the incident forces on the input surface may be measured and used to adjust the outputs of the first set of sensors, thereby providing an accurate measurement of a user-provided input force exerted on the input surface.

The embodiments make use of a variety of configurations for the dual sensors. In a one family of embodiments, an input surface, such as a cover glass, is positioned over a display layer that may comprise multiple individual layers such as stiffeners and lighting layers. These layers may include a force-sensing stack that includes a layer having a strain sensor positioned above a layer containing a pressure sensor. In another family of embodiments, both the strain sensor and the pressure sensor are positioned in a single layer within the force-sensing stack.

It will be understood that multiple such pair of sensors could be used as part of an array of sensors underlying the input surface. When such pairs of sensors are small in size compared to the input surface, an array of such dual sensors can provide accurate detection of the location at which a force is applied to an input surface, and so provide better user experience.

These and other embodiments are discussed below with reference to FIGS. 1-12. However, those skilled in the art will readily appreciate that the detailed description given herein with respect to these figures is for explanatory purposes only and should not be construed as limiting.

FIG. 1 shows an electronic device 100 that can include an input force sensor. The electronic device 100 includes a housing 104 to retain, support, and/or enclose various components of the electronic device 100, such as a display 102. The display 102 may be any suitable display element. In many cases, the display 102 may include a stack of multiple layers including, for example, and in no particular order: a cover glass layer, a light emitting diode layer, a touch input layer, and so on. Specific embodiments are shown in later figures and described below.

The various layers of the display 102 may be adhered together with an optically transparent adhesive. In some embodiments, each of the layers of the display 102 may be attached or deposited onto separate substrates that may be laminated or bonded to each other. The display 102 may also include other layers for improving the structural or optical performance of the display 102, including, for example, a cover glass sheet, polarizer sheets, color masks, and the like.

Figure 5:
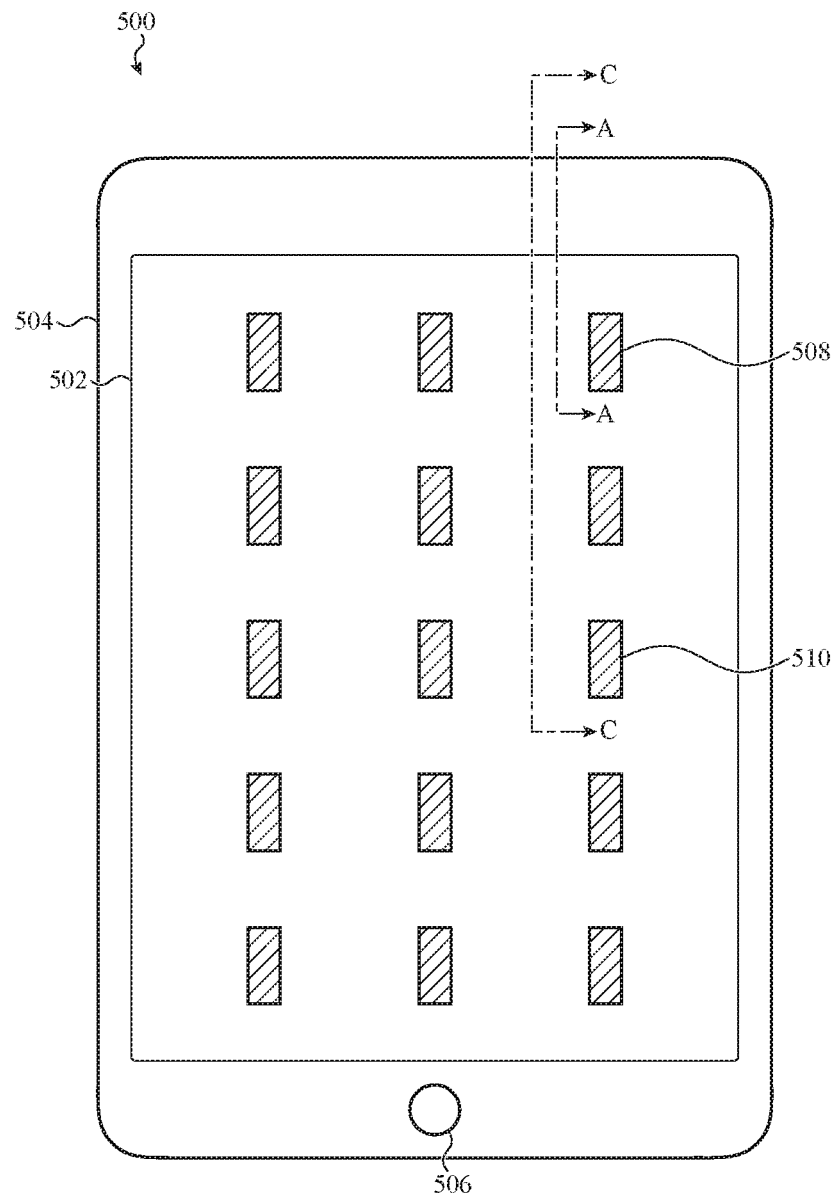
FIG. 5 shows a second exemplary electronic device that uses an array of dual force sensors.

Additionally, the display 102 may include one or more force sensors, such as force sensor 108, for determining or estimating a force applied on an input surface of the display 102 of the electronic device 100. The force sensor 108 may be configured to detect force inputs from a finger, from a stylus or other touch-based mechanisms. As explained in more detail below, in some embodiments the force sensors can be implemented as strain sensors, pressure sensors, or combinations of both. Though only one force sensor is shown in FIG. 1, as shown in FIG. 5, the force sensor 108 may be one of an array of force sensors underlying the display 102.

In many cases, the electronic device 100 includes within the housing 104 a processor, memory, power supply and/or battery, network connections, input/output ports, acoustic elements, haptic elements, digital and/or analog circuits for performing and/or coordinating tasks of the electronic device 100, and so on. For simplicity of illustration, the electronic device 100 is depicted in FIG. 1 without many of these elements, each of which may be included, partially and/or entirely, within the housing 104. In the embodiments disclosed below, the electronic device 100 can also include processing circuitry that accepts signals from the force sensors and provides estimates of forces applied to the input surface, such as a cover glass, of the display 102. The processing circuitry may be implemented as application software executed by the processor, as one or more application specific integrated circuits, as one or more field programmable gate arrays, or as individual circuit elements.

The processor can be configured to perform, monitor, or coordinate one or more tasks of the electronic device. For example, the processor may be configured to operate, and/or communicate with, one or more input sensors, such as one of the strain sensors and/or the pressure sensors such as described herein.

Furthermore, although illustrated as a cellular phone, the electronic device 100 can be another electronic device that is either stationary or portable, taking a larger or smaller form factor than illustrated. For example, in certain embodiments, the electronic device 100 can be a laptop computer, a tablet computer, a cellular phone, a wearable device, a health monitoring device, a home or building automation device, a home or building appliance, a craft or vehicle entertainment, control, and/or information system, a navigation device, and so on.

Figure 2A:
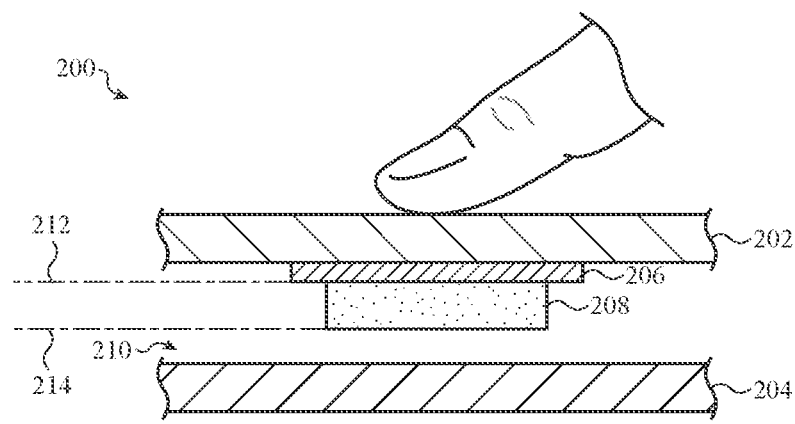
FIGS. 2A-C show cross-sectional views of interior components of an electronic device that uses dual force sensors during application of an input force, according to an embodiment.
Figure 2B:
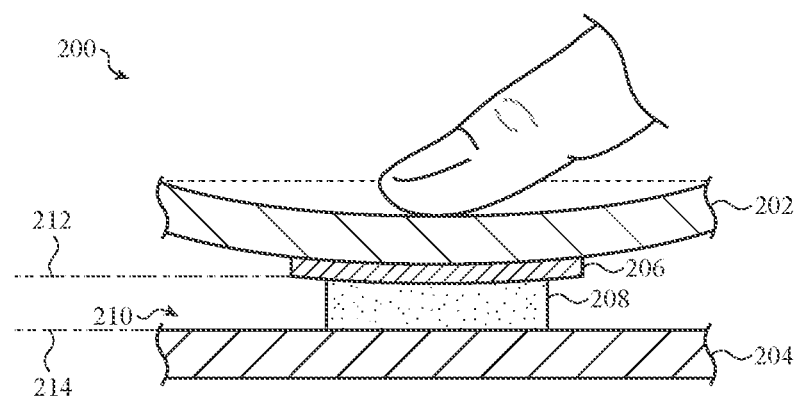
Figure 2C:
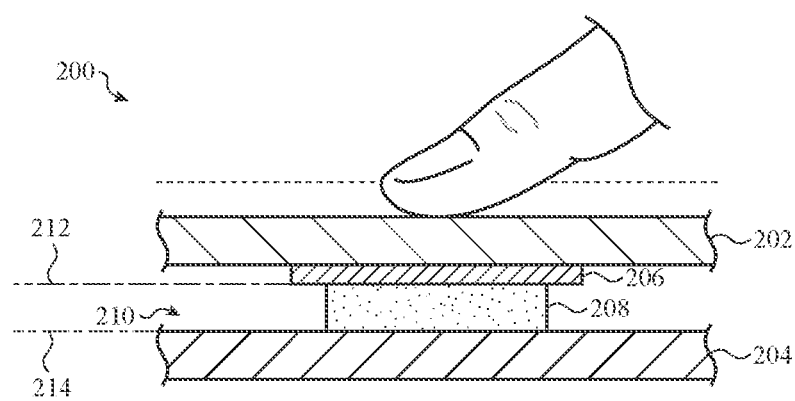

FIGS. 2A-C show simplified cross-sectional views along cut lines A-A of FIG. 1 of an electronic device having dual force sensors that is experiencing an input force. Many components that are often present are not shown in the figures for clarity of explanation.

FIG. 2A shows a cross-sectional view 200 of an electronic device having an input layer 202 in an initial rest state. A force-sensing stack is positioned opposite the user input side of the input layer 202. The force-sensing stack comprises a first sensor 206 positioned above a second sensor 208. Electronic connections 212 and 214 respectively connect the first sensor and the second sensor to processing circuitry (not shown) that uses the sensors' values to estimate an applied force.

Below the force-sensing stack is a compressible gap 210 separating the force-sensing stack from an additional component 204. In some embodiments the additional component may be a side of a housing of the electronic device. Alternatively, the additional component 204 may be another operational component of the electronic device, such as a battery, stiffener layer, or circuit layer, among other possibilities. The gap can either be empty (i.e., contain air or another gas inserted within the electronic device) or contain a compressible material, such as an aerogel.

In many embodiments the first sensor is a strain sensor that detects displacement, such as expansion or contraction, of a material, in this case the input layer 202. The strain sensor may be a resistance-based strain sensor, in which a resistance of a conductive strip varies in a known manner as its shape varies with the displacement of the input layer 202. The pressure sensor may be a capacitance-based sensor, in which, for example, there is a compressible dielectric material between two electrodes. An applied force can change the distance separating the two electrodes producing a measurable change in the capacitance. Alternatively, the pressure sensor may resistance-based, in which, for example, there is a conductive material between two electrodes. An applied force can change the conductivity of the conductive material to produce a change in resistance between the two electrodes.

FIG. 2B shows a cross-sectional view of the electronic device at initial levels of applied force. The input layer 202, and with it the underlying force-sensing stack, is deflected by a user. During the deflection of the input layer 202 from its rest position to the position shown in FIG. 2B, the input layer undergoes a continuous, uninterrupted expansion. The first sensor has a parameter (for example, resistance) that correspondingly changes. These changes allow the processing circuitry to estimate the applied force at various times during the deflection. The measurement times can be implemented by the processing circuitry.

At the initial levels of applied force, the second sensor also undergoes deflection. In those embodiments in which the second sensor is a pressure sensor, the second sensor may not experience any pressure as nothing is prevents it from moving with the deflection. In this case the processing circuitry could measure a quiescent value from the second sensor. A quiescent value will be a value of a parameter that indicates no pressure is occurring on the pressure sensor. In the case of a capacitance-based pressure sensor, this could be a default or nominal capacitance value, for example. In the case of a resistance-based pressure sensor, the resistance parameter could be so large as to indicate effectively an open circuit. Alternatively, the quiescent value could be a null (i.e., zero or near zero) value for a measured current.

FIG. 2C shows a cross-sectional view of the electronic device at larger levels of applied force to the input layer 202. In this situation, the input layer 202 has been deflected so far that the compressible gap 210 has closed. The force-sensing stack has come into contact with the additional component 204 and is unable to be deflected farther. In this situation, the first sensor may not be useful for accurate measurements of the applied force. For example, with a resistance-based strain sensor, there would no further change in shape of a resistive strip. Using such a resistance would indicate a leveling off of the applied force, or even give unpredictable results, rather than a still increasing applied force.

However, as the applied force continues to increase, the second sensor 208 begins to experience a pressure since a reaction force from the additional component 204 opposes the applied force. In the case that the second sensor is a pressure sensor, the processing circuitry could begin to detect a change a capacitance, resistance, current, or other parameter of the pressure sensor that correlates with the increase in applied force. The change in the parameter could then be used to estimate the applied force.

In this way using two sensors can allow the electronic device to operate with an extended range of values for a user applied force.

Figure 3A:
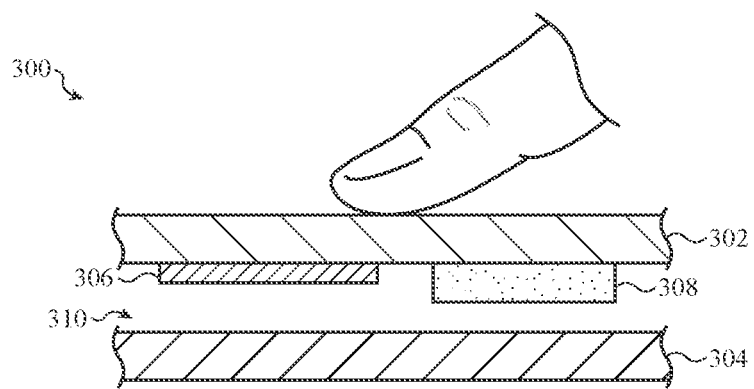
FIGS. 3A-C show cross-sectional views of interior components of an electronic device that uses dual force sensors during application of input force, according to an embodiment.
Figure 3B:
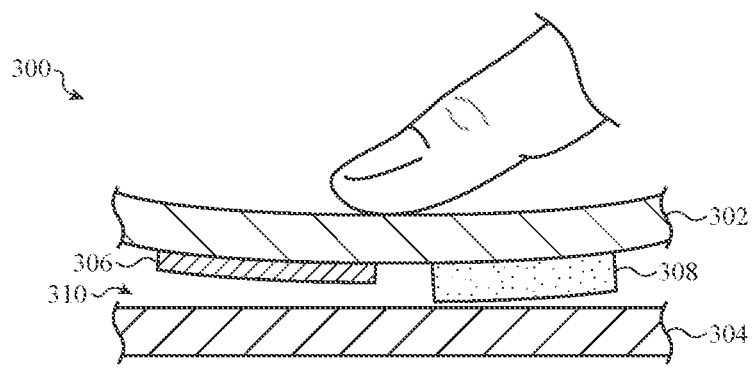
Figure 3C:
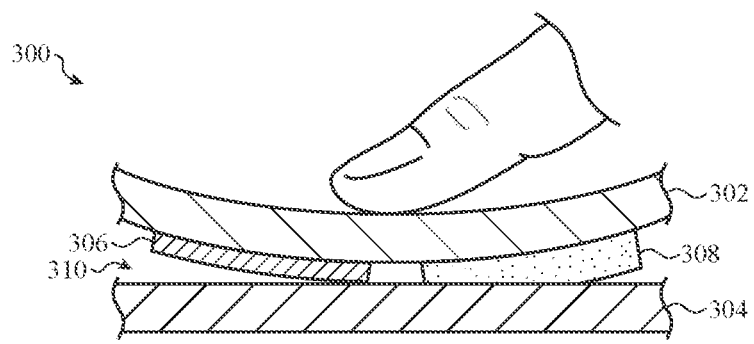

FIGS. 3A-C show simplified cross-sectional views along cut lines A-A of FIG. 1 of another electronic device having dual force sensors that is experiencing an input force. Many components that are often present are not shown in the figures for clarity of explanation.

FIG. 3A shows a cross-sectional view 300 of the electronic device having an input layer 302 in an initial rest state. In this example, the input layer 302 may comprise an outermost cover glass over various support and display layers. A force-sensing stack is positioned opposite the user input side of the input layer 302. The force-sensing stack comprises a first sensor 306 positioned in parallel with a second sensor 308. These two sensors may be embedded in a common structural layer or matrix (not shown) for attachment to the input layer 302. For clarity, electrical connections from each of the sensors to processing circuitry exist but are not shown. There is a compressible gap 310, as described above, separating the layer of the two sensors from an additional component 304. The additional component is as described previously.

FIG. 3B illustrates an initial stage of a force applied to the input layer 302. At this stage the input layer 302 has only partially been deflected so that the first sensor 306 does not contact the additional component 304, so that part of the compressible gap 310 persists. In this stage the first sensor 306 can be used to give reliable data that correlates with the force applied to the input layer 302. For example, when the first sensor is a resistance-based strain sensor, in which increases in the deflection of the input surface due to the applied force continue to produce a change in a resistance within the resistance-based strain sensor.

At this first stage the second sensor 308 may either be still be above the additional component 304, or begin contacting it. In the former case, the second sensor may be in a quiescent state, as described above, or alternatively experiencing a measurable change in an internal parameter that can be used to estimate the force applied to the input layer 302. For example, when second sensor 308 is a pressure sensor, deflection of the input layer 302 may still cause an increase in either a capacitance, resistance, or other parameter without the second sensor 308 contacting the additional component 304. In the latter case, the second sensor may detect a pressure as it contacts the additional component 304, and so be usable for estimation of the applied force.

In the situation when both the first sensor and second sensor can be determined to be usable for estimation of the applied force, an estimate from each may be obtained, and a weighted sum taken as the final estimate for the applied force.

FIG. 3C illustrates a later stage of an applied force to the input layer 302, in which the applied force is large enough that the first sensor 306 contacts the additional component 304. The compressible gap 310 may no longer separate the force-sensing stack from the additional component 304. In this situation further increases in the force applied to the input layer 302 may no longer correlate with changes in a parameter value of the first sensor 306. But the second sensor 308 may still be usable for estimating the applied force. For example, it may be a pressure sensor having a parameter, such as a resistance or a conductivity, which varies with internal stress, and not on movement or strain of a material.

Figure series 2A-C and 3A-C illustrate two structural configurations, i.e., vertical and parallel positioning, of dual sensors within a force-sensing stack. The two structural configurations of the dual sensors depicted in FIGS. 2A-C and FIGS. 3A-C are only exemplary and are not meant to illustrate the only possible, or even preferred, structural configurations of the dual sensors within the electronic device. Other structural configurations will be described below. The descriptions above present embodiments that use at least dual sensors to compensate for situations in which one sensor might become unreliable, to extend a range of values of the applied force that can be accurately estimated, and to provide combinable estimates for improved accuracy.

Figure 4A:
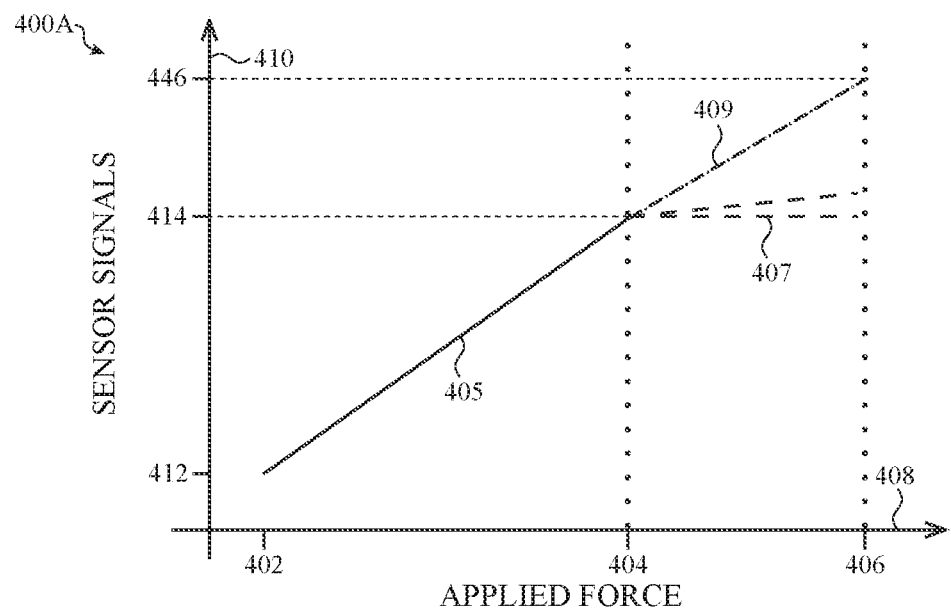
FIGS. 4A-C show graphs of sensor signals from two force sensors, according to a various embodiments.
Figure 4B:
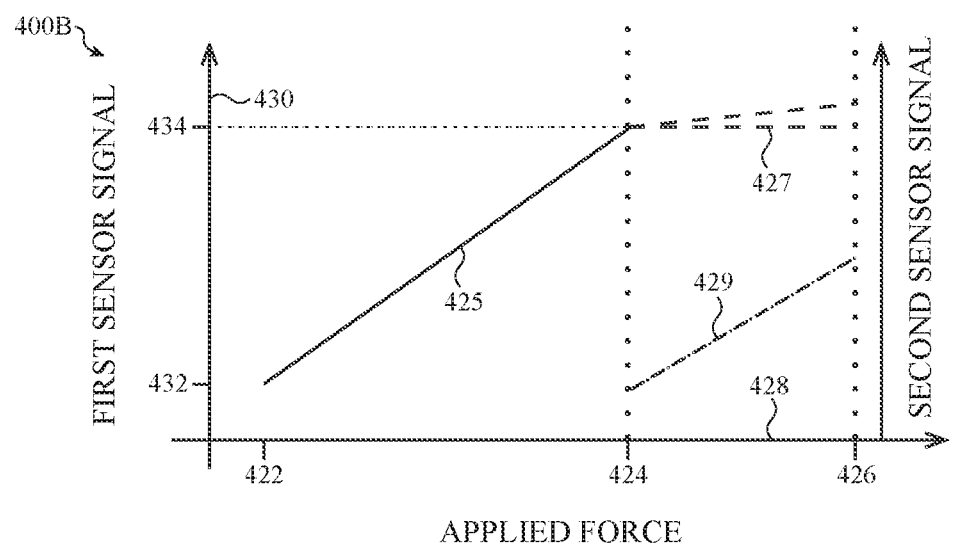
Figure 4C:
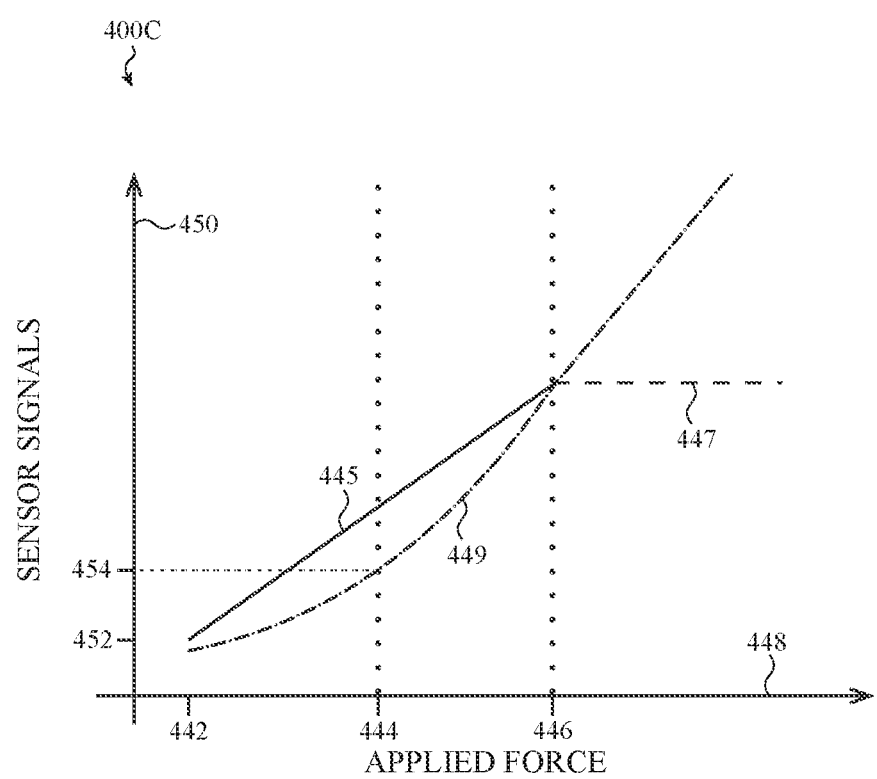

FIGS. 4A-C are example graphs of sensor signal values versus applied force on an input layer of an electronic device having dual sensors. As used herein, a sensor signal value may refer to a value of a sensor parameter measured by circuit components separate from the sensor. Alternatively, a sensor signal value can be a signal or output actively produced by a sensor containing circuitry, such as internal amplifying components, in addition to sensed parameter elements. The plotted respective lower limits of the applied force and of the sensor signals may be zero values, or such small values that there can be no meaningful correlation of the applied force and sensor signal values. For example, an applied force input below an input noise threshold level of the sensor will not correlate with the sensor's signal value. The plotted respective upper limits may represent a greatest possible or likely value of the applied force, such as the most that a user could apply with a stylus.

FIG. 4A is a graph 400A of values of sensor signals plotted on axis 410 versus an applied force to an input layer plotted on axis 408. For simplicity of explanation, the sensor signal values may be in arbitrary or scaled units in order to be plotted on the single axis 410. For example, in an embodiment a first sensor may be resistance-based strain sensor in which the sensor value is a resistance, and the second sensor is a capacitance-based pressure sensor in which the sensor value is a capacitance.

When the applied force lies within a first interval of values, indicated from points 402 to 404 on axis 408, the first sensor's signal values correlate accurately and reliably with the applied force. Though the functional form 405 of the correlation is depicted as linear, this functional form may have the form of other one-to-one functions, such as exponential, logarithmic, or increasing polynomial. When the applied force lies between values at points 402 and 404, the first sensor's signal values lie between values at points 412 and 414 on axis 410. This correlation may be obtained by any combination of experiment, theory, or simulation, either before or after assembly of the electronic device.

When the applied force lies within a second interval of values, indicated from points 404 to 406 on axis 408, the sensor signals from the first sensor may no longer have a reliable correlation with the applied force, as depicted by graph segments 407. This may result, as described above, when the first sensor is a strain sensor and the force has deflected the strain sensor so that it contacts an internal component and a greater applied force no longer causes displacement in it. Or it may be that such larger applied force values cause the first sensor to exceed an inherent design limitation.

For electronic devices having dual sensors, the second sensor's signal values may be used for detection of applied forces with values from point 404 to point 406 on the axis 408. Graph segment 409 shows the second sensor's signal values, extending from point 414 to 416 on axis 410, and their reliable correlation with applied force values between points 404 and 406.

FIG. 4B is a graph 400B that shows a first sensor's signal values plotted with respect to axis 430 versus a force applied to an input layer of an electronic device, plotted with respect to axis 428. Graph 400B also shows a second sensor's signal values, plotted with respect to axis 432, versus the applied force plotted on axis 428. For applied force values between point 422 to 424 on axis 428, the graph segment 425 shows a reliable correlation between the applied force and the first sensor's signal values, which range between output values at points 432 and 434 on axis 430.

For applied force values greater than at the point 424, the first sensor's signal values may no longer accurately or reliably relate with applies force, as indicated by the multiple possible values 427 of the first sensor. This may occur for any of the reasons mentioned above. But for applied forces from the values at 424 up to 426, the second sensor's signal may accurately correlate with the applied force, as indicated by the segment 429.

An electronic device using dual sensors with such signal-to-force graphs may have processing circuitry that detects when the first sensor's signal has reliable values in the interval from point 432 to 434. The circuitry may also detect when the first sensor's signal is no longer reliable for determining the applied force, and thereafter uses the second sensor's values to estimate the applied force on the input layer of the electronic device. In some embodiments the second sensor's values can be used without a scaling to match the scale of the first sensor's values.

FIG. 4C is a graph 400C of a first sensor's and a second sensor's signal values plotted respect to axis 450 versus a force applied to an input layer of an electronic device, plotted with respect to axis 448. As discussed in relation in FIG. 4A, the sensors' values may be assumed to be scaled to a common range of values for clarity of exposition.

For an applied force from a first value at point 442 to a second value at point 444, the first sensor's signal values correlate accurately with the applied force values, as shown by graph segment 445. The accurate correlation of the first sensor's signal values with the applied force also extends from the second force value at point 444 to a third force value at point 446. For applied force values greater than at point 446, the first sensor's signal values may no longer correlate accurately with the applied force, as indicated by the graph segment 447.

For force values from a first value at point 442 to a second value at point 444, the second sensor's signal values may or may not correlate with the applied force values. Even if the second sensor's signal values do correlate with applied force values, they may be small enough so that the signal-to-noise ratio is much larger than that for the first sensor's signal. In such situation, processing circuitry of the electronic device uses just the first sensor's signal values to estimate the applied force.

For applied force values from point 444 to point 446, the second sensor's signal values correlate accurately with the applied force. For applied force values above point 446 the processing circuitry of the electronic device uses just the second sensor's signal values to estimate the applied force.

In situations illustrated in FIG. 4C, in the intermediate range of applied force values from point 444 to point 446, the applied force may be estimated by use of either the first or second sensor's signals. The processing circuitry may base a selection on a detected or expected signal-to-noise ratio. Additionally and/or alternatively, the processing circuitry may estimate the applied force using a weighted valuation of both sensors' signal values. The weights used in weighted valuation may vary with an initial estimate for the applied force. For example, when the second sensor's signal is used and indicates the applied force is greater than but near the value at point 444, more weight may give to the first sensor's signal. But when the second sensor's signal indicates the applied force is less than but near the value at point 446, more weight may be given to the second sensor's signal. The weighted valuation may be a weighted average, sum, or any other valuation.

FIG. 5 shows an exemplary electronic device 500 that uses multiple dual sensors, such sensors 508 and 510, for detecting an applied force at localized positions on an input surface 502. As described above, the input surface may be the outer surface of an input layer of the electronic device 500. The input layer may further comprise a display layer, a lighting layer, a stiffening layer, or other layers. The electronic device includes a housing 504 that, with the input layer, defines an interior space in which various components of the electronic device are contained. The electronic device 500 can receive user inputs either through the dedicated input element 506 or by forces applied to the input surface 502.

The multiple dual sensors may be configured in one or more arrays of sensors underlying the input surface 502. For example, in a first family of embodiments, a first array may comprise strain sensors within a first layer connected to the interior side of the input layer. In this way they are able to detect localized displacements or deflections of the input surface 502. A second array for the second sensors, such as pressure sensors, may be positioned in a structural layer below the first layer. In a second family of embodiments, both an array of strain sensors and an array of pressure sensors may be configured in a single layer structural layer. Other configurations may be used, some embodiments of which will now be described.

FIGS. 6A-F illustrate cross-sectional views of embodiments of structural configurations of electronic devices that make use of dual sensors for applied force sensing. The views are along the cut line B-B shown in FIG. 5. The proportions, sizes, shapes, quantity and specific configurations of the components shown in FIGS. 6A-F and described below are exemplary and do not limit the actual proportions, sizes, shapes, quantity and specific configurations of components of the embodiments disclosed herein.

Figure 6A:
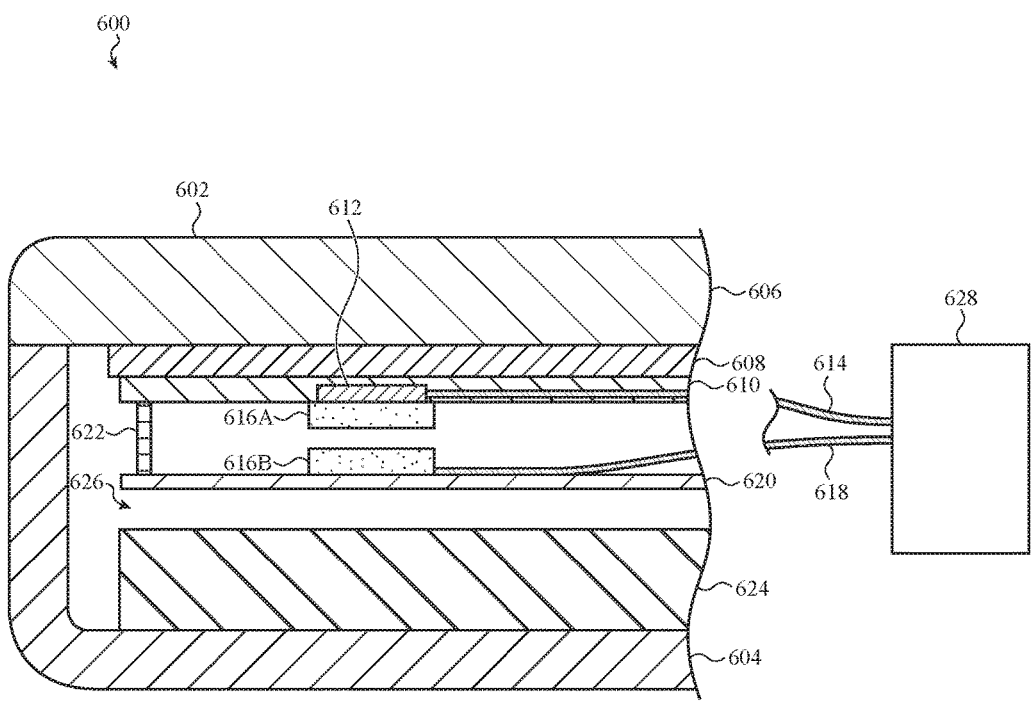
FIGS. 6A-F show cross-sectional views of configurations of electronic devices that use dual force sensing, according to various embodiments.
Figure 7:
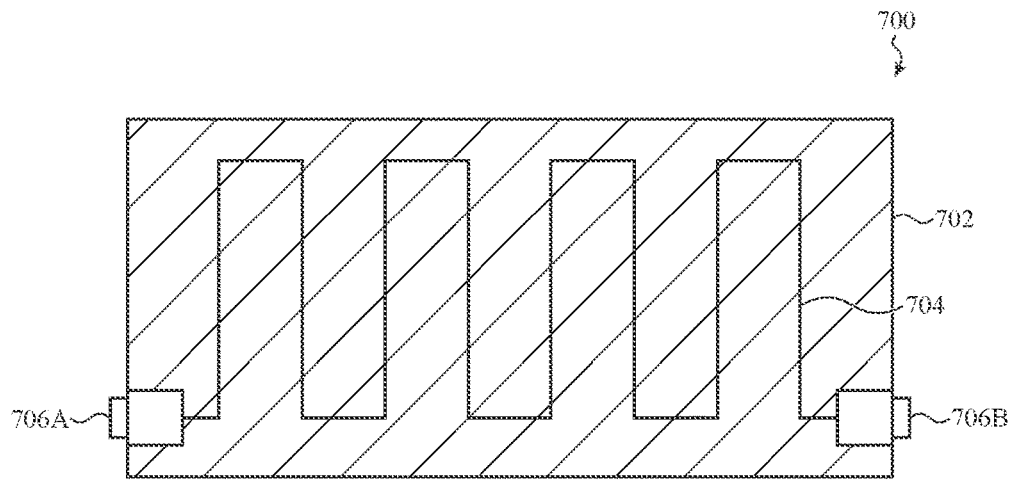
FIG. 7 shows a configuration of a strain sensor, according to an embodiment.

FIG. 6A shows a cross-sectional view of an electronic device 600 having dual force sensors. The input layer 606 defines an input surface 602. The input layer 606 may be a cover glass. The input layer 606 mates with a housing 604 to define an interior space between them to contain various components as shown. Part of the housing 604 defines a back side of the electronic device 600, i.e., an outer surface opposite to the input surface 602. On the side of the input layer 606 opposite the input surface 602 is secondary layer 608 that may be or have a display layer or a stiffener layer. Beneath the secondary layer 608 (i.e., towards the interior space) is a strain sensor layer 610 that contains a strain sensor 612. In various embodiments, strain sensor 612 may be resistance-based in which a thin metallic strip is embedded in a serpentine pattern within a film. As a force is applied to the input surface 602, the input layers, the secondary layers, and strain sensor layer 610, stretch or deflect so that the resistance of the metallic strip varies. An illustration of such metallic strip is shown in FIG. 7. The strain sensor 612 has electrical connections 614 to processing circuitry 628. The electrical connections 614 may be implemented as one or more wires, metallic traces, or other structures known in the art.

Beneath the strain sensor layer 610 is a pressure sensor layer 620 that is connected to the strain sensor layer by spacers 622. A pressure sensor having two electrodes 616A and 616B is configured above the pressure sensor layer and below the strain sensor layer 610. The pressure sensor has electrical connections 618 to the processing circuitry 628.

A space or compressible gap 626 is configured beneath the pressure substrate layer to separate the pressure substrate layer from an additional internal component 624. There may be more than one such additional internal component 624. Alternatively, there may be no such internal component between the pressure sensor layer 620 and the interior surface of the housing 604. The internal component 624 may be a battery for powering the electronic device. In some embodiments, during operation of the electronic device the battery may expand due to heating to reduce the size of the compressible gap 626.

When a force is applied to input surface 602, the input layer 606, secondary layer 608, strain sensor layer 610 and the pressure sensor layer 620 may all be deflected towards internal component 624. For a first range of applied forces, the deflection may not cause the layers to contact the internal component 624. The resistance of the strain sensor 612 then correlates with the deflection and so can be used by the processing circuitry to estimate the applied force. In this situation there may be no compression between the strain sensor layer 610 and the pressure sensor layer 620 so that the pressure sensor is in a quiescent state that does not detect a force.

But for large enough applied forces the deflection can cause the layers to impinge on the internal component 624. This can cause a distance between strain sensor layer 610 and the pressure sensor layer 620 to exert forces from opposite sides onto the pressure sensor. The pressure sensor may be capacitance-based so that these opposite forces compress a dielectric (not shown) between electrodes 616A and 616B. The change in capacitance can be measured by processing circuitry 628 and used to estimate the applied force. Alternatively, the pressure sensor can be resistance-based, in which, for example, either a resistance or a current changes as the opposite forces impinge on electrodes 616A and 616B.

Figure 6B:
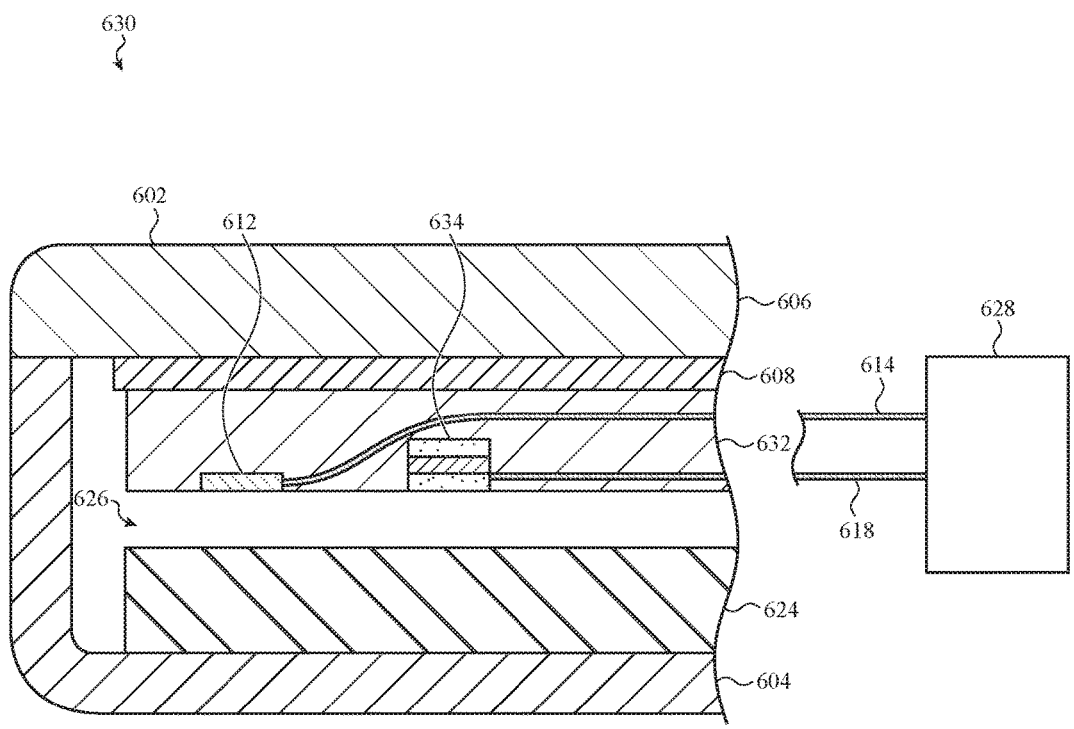

FIG. 6B shows a cross-sectional view of a second electronic device 630 having dual force sensors. The electronic device has an input surface 602, an input layer 606, a secondary layer 608, a compressible gap 626, and a housing 604 as described for the electronic device. In this configuration the dual sensors are a strain sensor 612 and a pressure sensor 634 that are both embedded in a common substrate layer 632. Each has a respective electrical connection 614 and 618 to processing circuitry 628 as described above.

The operation of electronic device 630 is similar to that electronic device 600. For a first range of values of a force applied to the input surface 602 the deflection of the shown underlying layers and substrates may not bring them into contact with internal component 624. In this case a parameter or signal of strain sensor 612 is measured by processing circuitry 628 and used to estimate the applied force. In some embodiments of electronic device 630 a parameter or signal of pressure sensor 634 may vary without the common substrate layer impinging against the internal component 624. This variation may be detectable by the processing circuitry and used to obtain another estimate for the applied force. Such embodiments were described above in relation to FIG. 4C.

Larger applied forces may cause the common substrate layer 632 to deflect sufficiently to eliminate the compressible gap 626 and impinge against internal component 624. In this situation, a parameter or signal of pressure sensor 634 may begin to change more rapidly than when the common substrate layer does not impinge. This onset of more rapid change can be used by the processing circuitry to determine that the signal of the strain sensor 612 will not be reliable, and that it is to use only the signal of the pressure sensor to estimate the applied force.

Figure 6C:
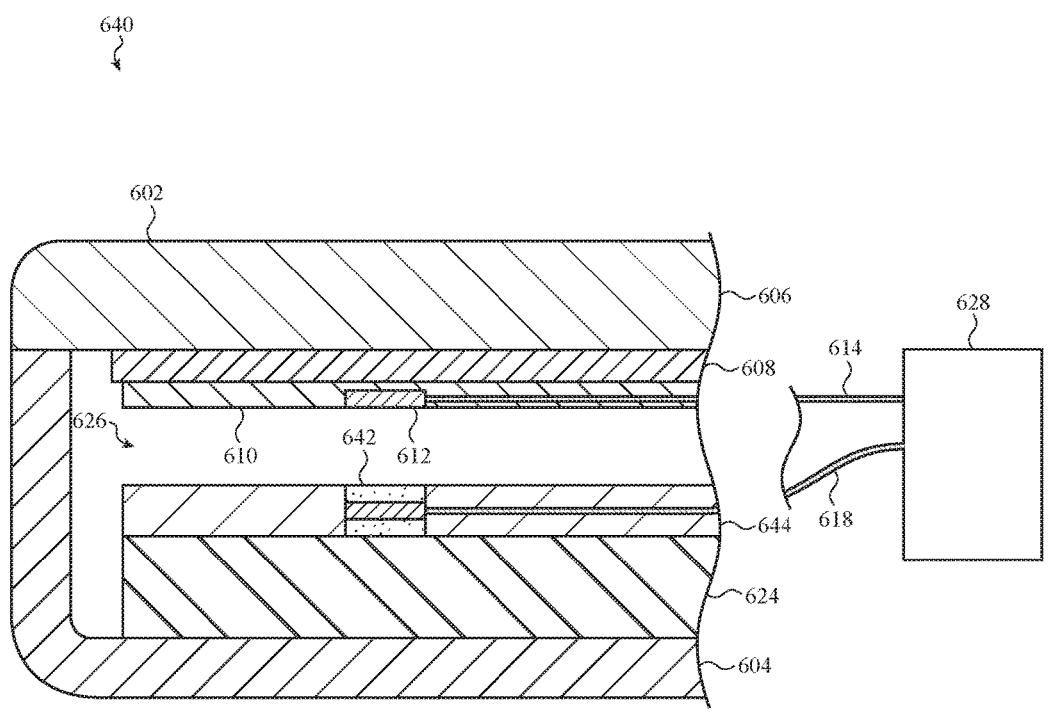

FIG. 6C shows a cross-sectional view of a third electronic device 640 having dual force sensors. The input surface 602, input layer 606, secondary layer 608, housing 604 and internal component 624 are as in described above. In the electronic device 640 a strain sensor 612 is embedded in strain sensor layer 610 and connected to processing circuitry 628 by electrical connection 614, as described above. For electronic device 640, however, a compressible gap 626 now forms a separation between the strain sensor layer 610 and a pressure sensor layer 644 positioned on or in contact with the internal component 624. The pressure sensor layer 644 includes a pressure sensor 642 that is connected to the processing circuitry 638 by electrical connection 618.

Detection of applied forces by electronic device 640 uses a signal of the strain sensor while it is determined that the strain sensor layer 610 has not been deflected enough to impinge on the pressure sensor layer 644. In this situation, pressure sensor 642 is typically in a quiescent state and its signal is not used to estimate the applied force.

But when the applied force is sufficient to deflect the strain sensor layer 610 enough so that it does impinge on the pressure sensor layer 644, the pressure sensor 642 can produce a signal value that can be measured by processing circuitry 628. When processing circuitry 628 detects this signal value, it can alternate from using the strain sensor's signal to using the pressure sensor's signal to estimate the applied force.

Figure 6D:
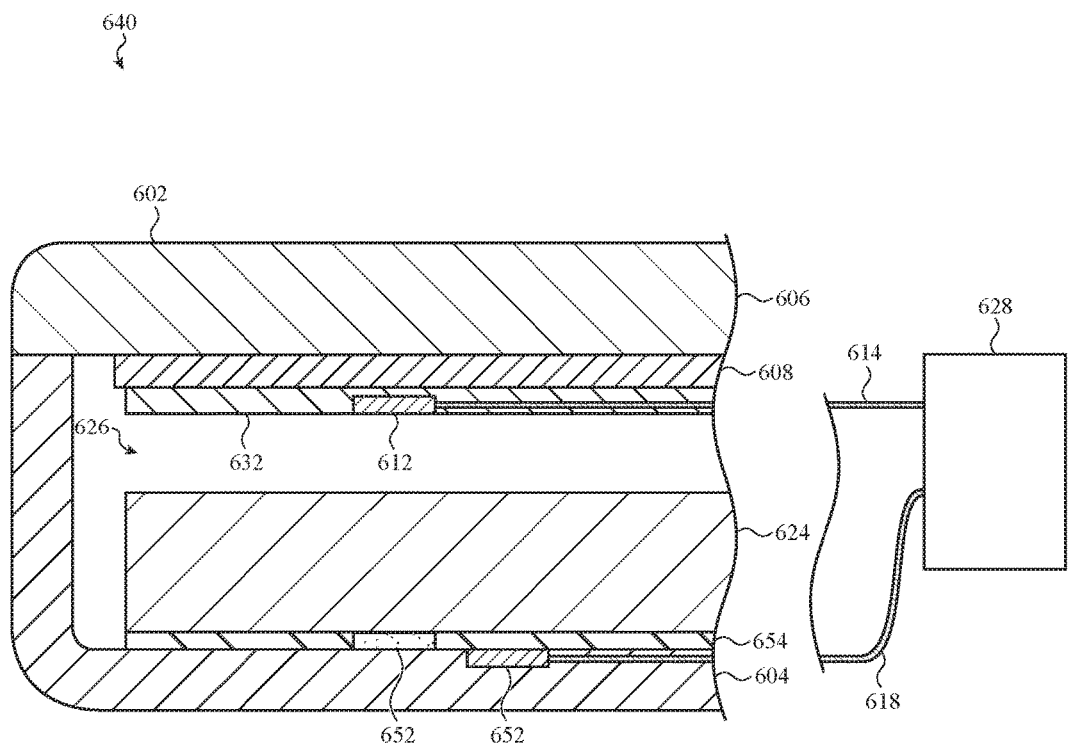

FIG. 6D shows a cross-sectional view of a fourth electronic device 650 having dual force sensors. The embodiment shown in FIG. 6D is similar to that shown in FIG. 6C, except that now a pressure sensor layer 654 containing pressure sensor 652 is positioned between internal component 624 and the housing 604. Force detection of electronic device 650 is the same as for electronic device 640.

Figure 6E:
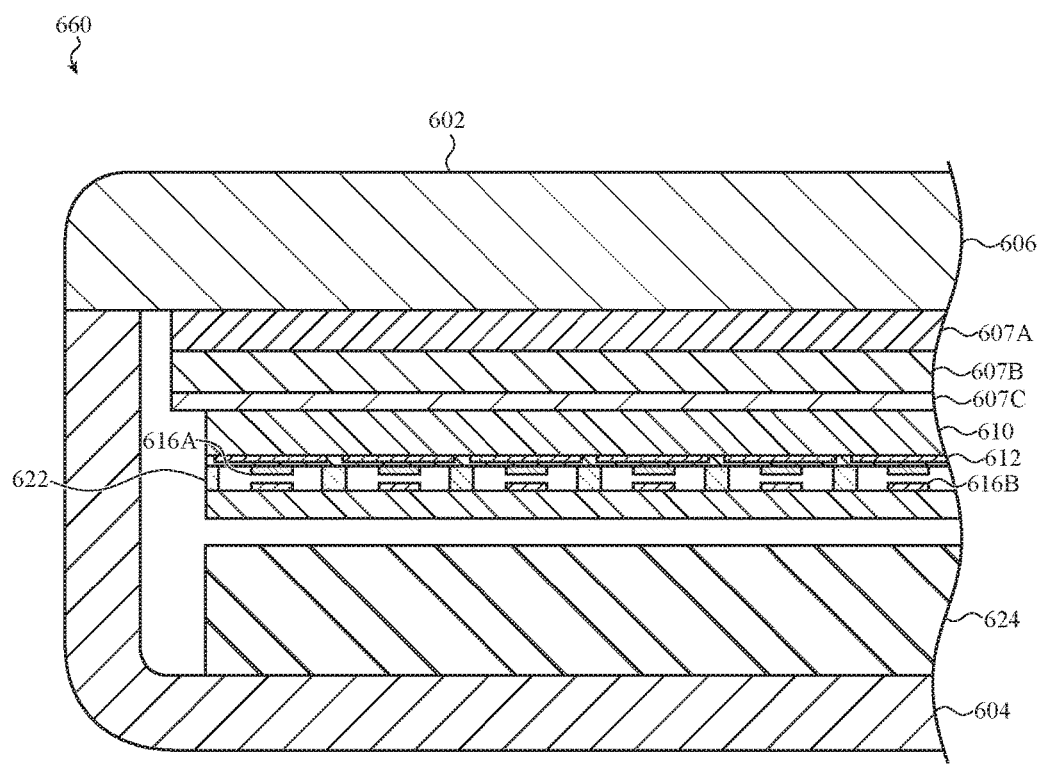

FIG. 6E shows a cross-sectional view of a fifth electronic device 660 having dual force sensors. The configuration of electronic device 660 is similar to that of electronic device 600 of FIG. 6A. However, constituent layers 607A-C within the secondary layer 608 are now shown. Touch layer 607A supports the input layer 606, which may have a cover glass and may be transparent or have transparent sections. Below touch layer 607A is a display layer 607B which may include light emitting diodes (LEDs), such as organic LEDs, to create images displayed to a user through a cover glass of input layer 606. A stiffener layer 607C may be included to provide structural support.

Figure 6F:
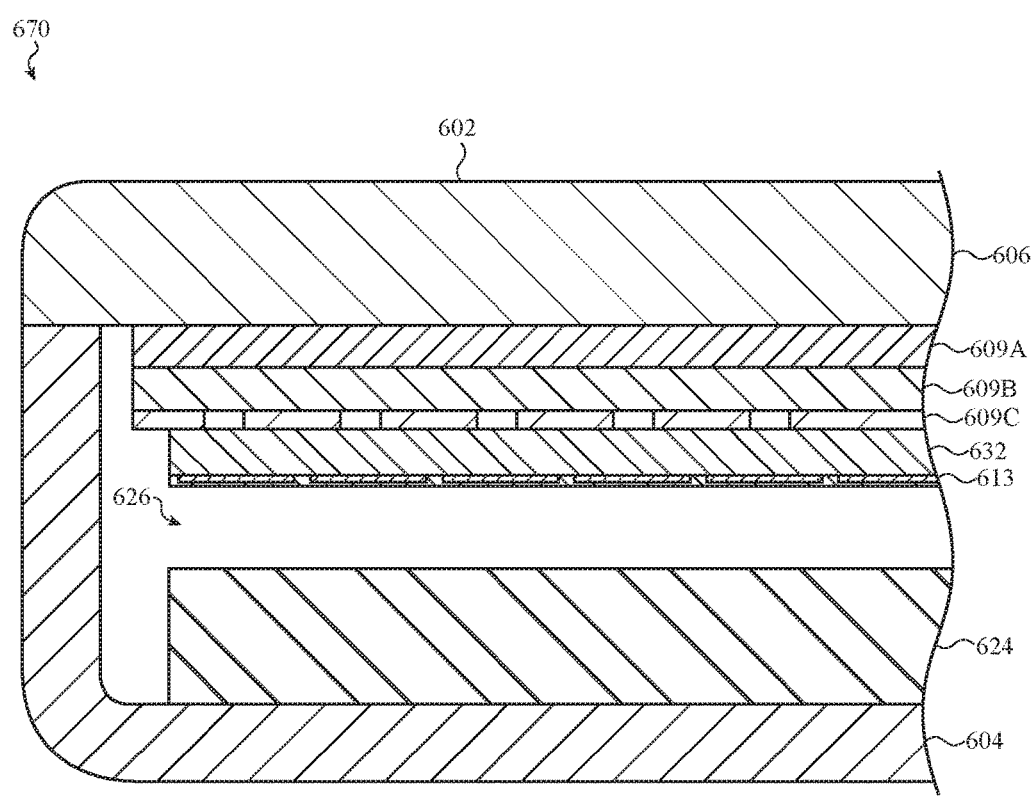

FIG. 6F shows a cross-sectional view of a sixth electronic device 670 having dual force sensors. The configuration of electronic device 670 is similar to that of electronic device 630 of FIG. 6B. However, constituent layers 609A-C within the secondary layer 608 are now shown. The constituent layers include a touch layer 609A above a display layer 609B. The display layer 609B can include LEDs, as described above, or other light sources to create graphic images seen by a user through a cover glass of input layer 606. Another constituent layer is a stiffener layer 609C as previously described.

In the electronic device 670, there is a common substrate layer 632 containing strain sensor 613 and an adjacent pressure sensor. The strain sensor and pressure sensors may be part of an array of strain and pressure sensors as described above in relation to FIG. 5. In operation the electronic device 670 may be able operate so that both sensors can be used to estimating an intermediate range of applied forces, as described in relation to FIG. 4C.

In addition to the embodiments of FIGS. 6A-F, other embodiments can use other configurations of dual force sensors. It would clear to one of skill in the art that in other embodiments the dual sensors may consist of a pair of strain sensors, or a pair of pressure sensors. Exemplary embodiments of force detecting sensors, both strain sensors and pressure sensors, are presented next in FIG. 7 through FIG. 9B.

FIG. 7 conceptually illustrates a strain sensor 700. Strain sensor 700 includes a thin non-conductive film 702, on which is deposited a metallic or other conductive strip 704 between two electrodes 706A-B which connect to measuring or sensing circuitry. When strain sensor 700 is affixed to a surface, such as one of the layers described above, as the surface flexed or stretched, the film 702 and the strip 704 correspondingly flex or stretch. This can produce a detectable change in the resistance of the strip 704 from the amount of flex or stretch can be inferred. When used as a strain sensor in an electronic device, such as the embodiments described above, the amount of flex or stretch can be correlated with the amount of applied force. This correlation can be determined either determined by experimentation, simulation or other means. As a result, one has a correlation between the observed resistance and the value of force applied to the input surface of the electronic device.

Figure 8:
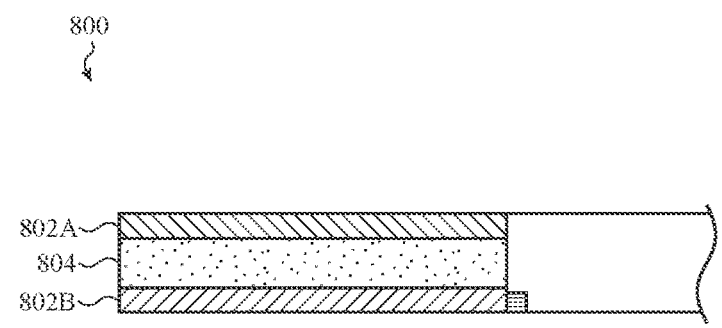
FIG. 8 shows a configuration of a capacitance-based pressure sensor.

FIG. 8 shows an exemplary capacitance-based pressure sensor 800 that includes two electrodes 802A and 802B between which there is a dielectric 804. A force on electrode 802A towards electrode 802B together with another force on electrode 802B towards electrode 802A cause the dielectric 804 either to compress in size or to have its dielectric constant vary. In either case the capacitance between electrodes 802A and 802B can change sufficiently that the net force applied to the pressure sensor 800 can be correlated with the change in capacitance.

Figure 9A:
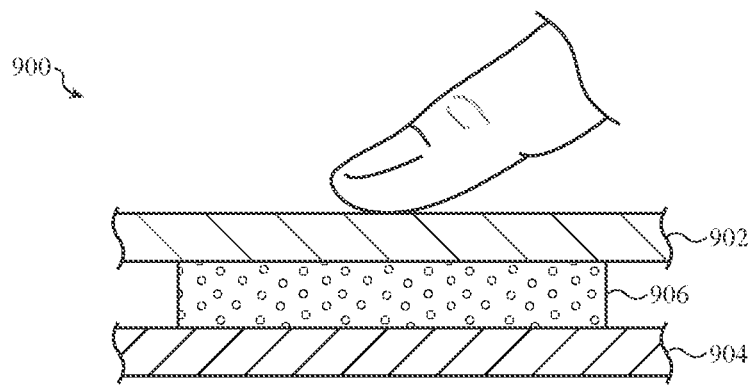
FIGS. 9A-B show cross-sectional views of a resistance-based pressure sensor during application of an input force, according to an embodiment.
Figure 9B:
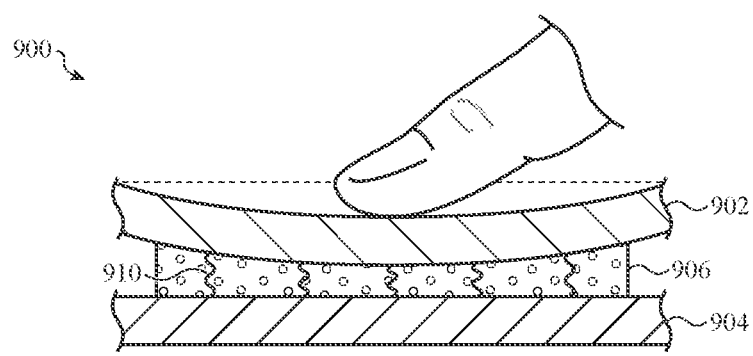

FIGS. 9A-B show an exemplary resistance-based pressure sensor 900 respectively in a rest state and in an active state. The resistance-based pressure sensor 900 comprises opposed electrodes 902 and 904 between which is material 906 having a conductivity that varies with applied pressure. The material may be composed of separated conducting particles in a partially conductive matrix material. Other embodiments may use alternative materials and configurations which have a conductivity that depends on the applied pressure.

In FIG. 9A the pressure sensor 900 is in a rest state in which no force from either side is applied. The material 906 is uncompressed so that the conductivity is low, or equivalently the resistance to a voltage applied across electrodes 902 and 904 is extremely high. In this state the pressure sensor 900 is in a quiescent state.

In FIG. 9B a force is applied to pressure sensor 900 so that the material 906 compresses in size. When the voltage is applied to the electrodes, the compression allows the conducting particles to become closer together and so allow a current to flow between electrodes. In this way there can be a correlation between amount of applied force and the current. Further compression due to increased applied force can cause a corresponding increased current.

When a sensor, either a strain or a pressure sensor, is resistance-based, the processing circuitry may include a bridge configuration that allows the resistance values to be measured accurately. One such bridge configuration is the Wheatstone bridge configuration shown in FIG. 10A. To measure the unknown resistance 1008 $R_X$, known resistors $R_1$ at 1002, $R_2$ at 1004, and $R_3$ at 1006 are configured as shown. When a known voltage 1010 is applied to lead 1016, the value of $R_X$ can be inferred from by a voltage across terminals at 1012 and 1014. The processing circuitry of electronic devices can include all parts of the bridge except $R_X$, which is internal to the sensor under measurement.

Figure 10A:
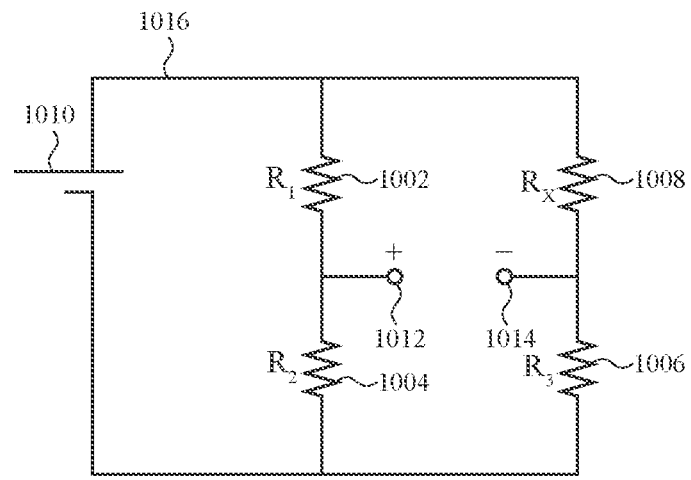
FIGS. 10A-C show circuit diagrams for measuring sensor values, according to various embodiments.
Figure 10B:
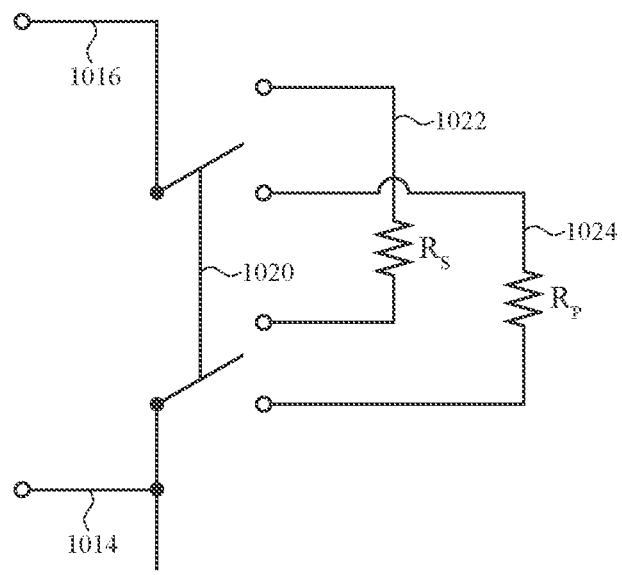

FIG. 10B illustrates an exemplary configuration for a switch 1020 to be used as part of the processing circuitry so that a single, common bridge can be used to measure both the resistance $R_S$ of path 1022 of a strain sensor and the resistance $R_P$ of path 1024 of a pressure sensor. The switch lies between leads 1016 and 1014 of FIG. 10A. The switch 1020 can be thrown alternately in sequence to effect a multiplexing of the electrical connections from the strain sensor and the pressure sensor. The switch 1020 may be implemented by fast switching transistors, for example.

Figure 10C:
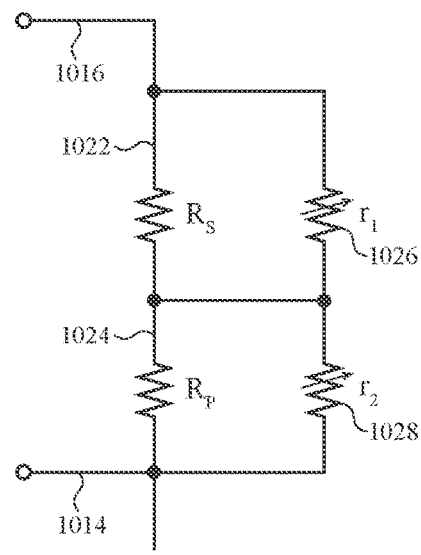

FIG. 10C illustrates an exemplary configuration by which a weighted sum of the resistance $R_S$ of a strain sensor and the resistance $R_P$ of a pressure sensor can be measured using the bridge circuit of FIG. 10A. A first variable resistor $r_1$ at 1026 is configured in parallel with the resistance $R_S$ of a strain sensor at path 1022. This combination is placed in series with a parallel combination of a second variable resistor $r_2$ at 1028 and the resistance of a pressure sensor at path 1024. This series combination is then measured as the unknown resistance 1008 $R_X$ of FIG. 10A.

When $r_1$ is effectively made infinite and $r_2$ is made zero, the resistance of the entire series combination is that of $R_S$. Alternatively, when $r_1$ is effectively made zero and $r_2$ is made infinite, the resistance of the entire series combination is that of $R_P$. By choosing finite nonzero values for each of $r_1$ and $r_2$, the series combination of FIG. 10c becomes a weighted sum of $R_S$ and $R_P$.

In some embodiments, the variable resistors $r_1$ and $r_2$ are implemented as fast switching voltage controlled FET transistors, or other electronic switching circuits. The appropriate voltage to apply to each can be determined by the processing circuitry according to the desired weights for $R_S$ and $R_P$.

Figure 11:
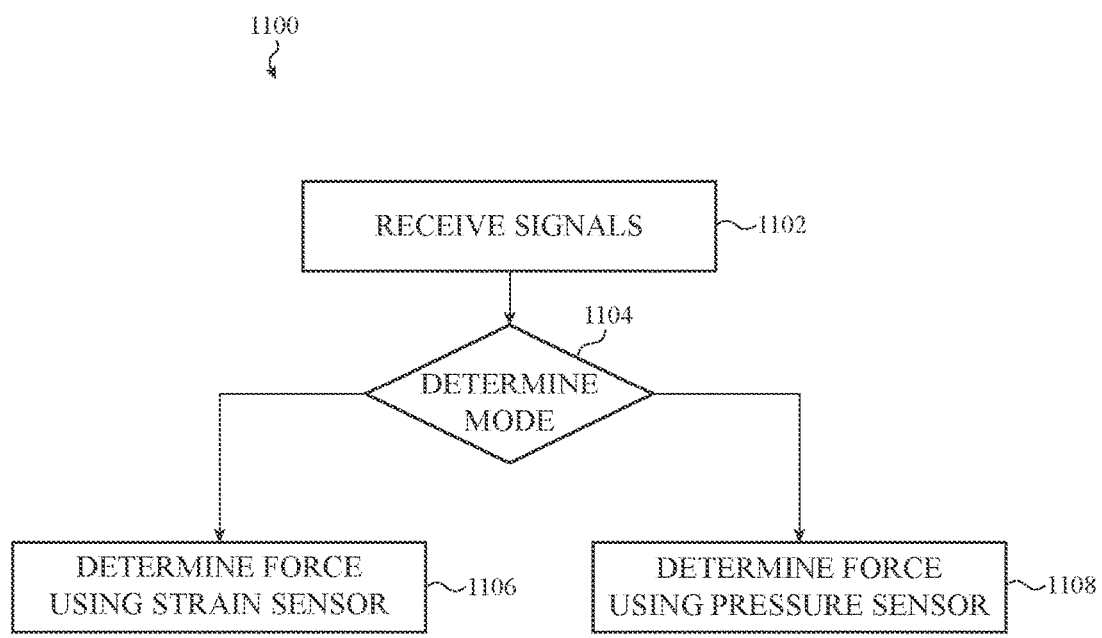
FIG. 11 is a flow chart of a method for estimating a force applied to an input surface of an electronic device, according to an embodiment.
Figure 12:
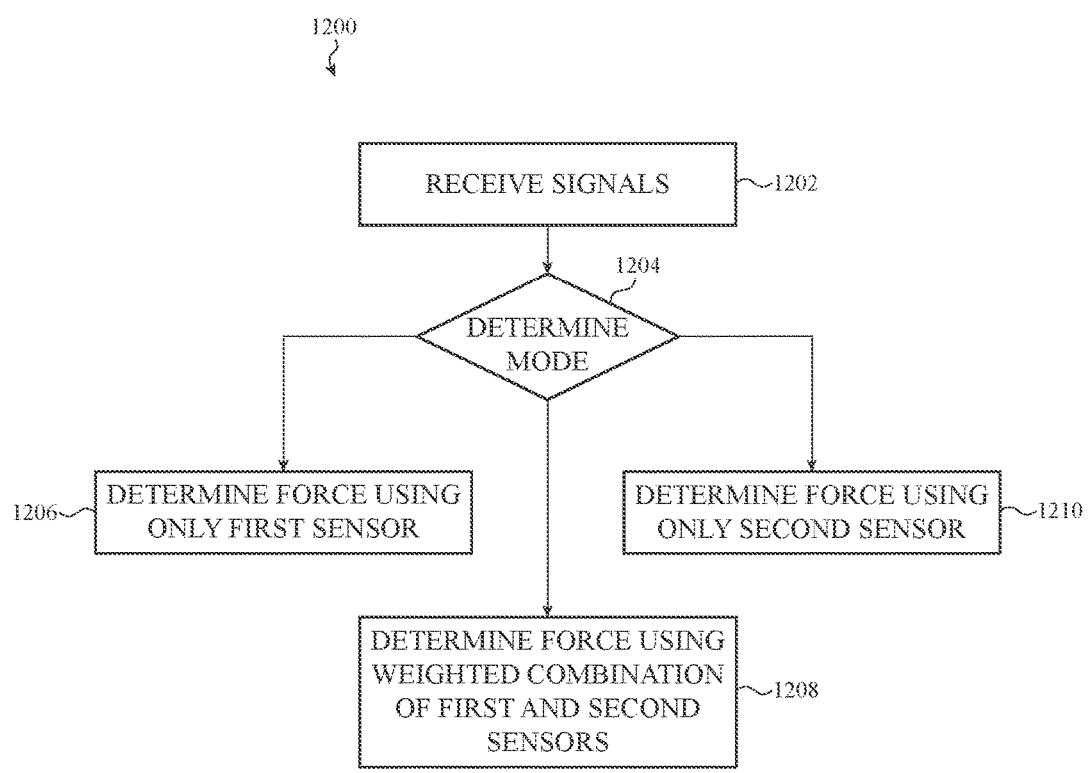
FIG. 12 is a flow chart of a method for estimating a force applied to an input surface of an electronic device, according to an embodiment.

FIG. 11 and FIG. 12 present flow charts of methods that can be used by electronic devices having dual sensors for determining an applied force at a location on an input surface. As described above, the electronic devices may comprise multiple pairs of sensors configured as parts of one or more arrays, or each pair individually positioned to detect applied forces at multiple locations at multiple locations on the input surface. The methods can be applied to each pair of sensors.

FIG. 11 is a flow chart for a method 1100 that can be used by electronic devices having dual sensors, especially dual sensors that can operate in alternate modes. An example of one such an electronic device is the embodiment shown in FIG. 6C, in which a signal that a pressure sensor has left a quiescent state indicates that a compressible gap has closed, and that signal values from a strain sensor are likely no longer reliable.

At stage 1102 signals are received from the sensors. As explained in the example presented in relation to FIG. 10B, the signals can be received by a single, common bridge circuit in the processing circuitry dedicated for both sensors. In such an embodiment the reception may be performed by toggling the switch 1020. Other embodiments may use a pair of bridge circuits, each dedicated to one sensor. Still other embodiments may use other signal sensing structures.

At stage 1104 the signals are compared to determine a mode to use for estimating the applied force. The determination may be based on any combination of multiple criteria. As an example, one criterion is that a pressure sensor remains in a quiescent state, so that its signal is not useful for estimating an applied force. This could occur when the input layers, and/or any underlying layers, can still be deflected further. In this case the determination would be to use a signal from a strain sensor measuring displacement of the input layer.

Another criterion in this example is that the signal from the pressure sensor, either resistance-based or capacitance-based, has left a quiescent state. This can indicate that a deflection of an input layer has caused it or other layers to impinge on an internal component and so are unable to deflect further. A strain sensor's signals may no longer be reliable for estimating force. In this case the determination would be to use the signal from the pressure sensor.

When the determination is made to operate in at least a partial strain-sensing mode, at stage 1104 a determination of the applied force is made using the signal from the strain sensor. If the determination is made to operate in at least a partial pressure-sensing mode, at stage 1106 a determination of the applied force is made using the signal from the pressure sensor. It should be appreciated that the strain signal and pressure signal may be used together to determine an input force, and so the determination to operate in either mode is not exclusive or binary. The two signals may be used in a weighted value to determine a force input, for example. In some embodiments, the two modes may be exclusive.

FIG. 12 is a flow chart for a method 1200 that can be used by electronic devices having dual sensors; in particular, when the dual sensors that can operate in an overlapping mode. One such electronic device is shown in FIG. 6B, and described above.

At stage 1202 signals are received from each sensor in the dual sensor pair. As described above for method 1100, this reception can either be by a single bridge circuit that toggles between connections to each sensor, by a dedicated reception circuit for each sensor, or by other signal sensing structures in the processing circuitry of the electronic device.

At stage 1204 a determination is made of a mode to use for estimating an applied force. A first determination may be to use only the signal from a first sensor, such as a strain sensor. This determination may occur when the second sensor is a pressure sensor whose signal still indicates it is in a quiescent mode.

A second determination may be to use a weighted combination or value of the signals from both sensors. As an example, this determination may be made when a pressure sensor indicates a force is being applied to it, but the force level indicates that an input layer can still undergo further deflection.

A third determination may be to use only the signal from the second sensor. As an example, this determination may be made when the signal from the pressure sensor indicates that the input layer can no longer deflect due to contact with an internal component.

When the first determination is made, the method enters stage 1206, and the applied force is estimated using only the first sensor. When the second determination is made, the method enters stage 1208, and the applied force is estimated using the signals of both the first and the second sensor. This estimation may be based on a weighted combination of the sensor signals, or a weighted combination of separate estimates of the applied force based on the separate signal values. When the third determination is made, the method enters stage 1210, and the applied force is estimated using only the signal of the second sensor.

Although embodiments discussed herein have generally referred to resistance-sensing and/or capacitive-sensing pressure sensors, it should be understood and appreciated that other types of pressure (or force) sensors may be employed. For example, some implementations of concepts and/or embodiments disclosed herein may use piezoelectric sensors, pyroelectric sensors, optical sensors, and the like to detect pressure (and, in some cases, strain). Any such sensors may be transparent or opaque, depending on the particular material and/or application. For example, in embodiments where a sensor is placed on or above a display of an electronic device, the sensor may be transparent. In embodiments where the sensor does not interfere with viewing information on a display or is otherwise not visible from the outside of the electronic device, the sensor may be opaque or transparent. Suitable transparent sensors include piezoelectric polymer films, such as PLLA and P(VDF-CTFE-TrFE), transparent resistive strain sensors, which may be formed from ITO and/or GZO films, and transparent resistive pressure sensors, which may be formed from CNT and/or graphene polymer-based composites. It should be appreciated that this is a non-exhaustive list and other types of sensors, and other materials, may be used.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
   an input layer defining an input surface;
   a force-sensing stack coupled to the input layer and operable to detect a force applied to the input surface, the force-sensing stack comprising:
   a strain sensor; and
   a pressure sensor;
   an additional component positioned below the force-sensing stack;
   a compressible gap positioned between the input layer and the additional component and separate from the strain sensor and the pressure sensor; and
   processing circuitry;
   wherein the processing circuitry:
   is coupled to the force-sensing stack to receive a first signal from the strain sensor and to receive a second signal from the pressure sensor;
   determines, using at least one of the first signal and the second signal, whether compression of the compressible gap exceeds a threshold;
   operates in an at least partial strain-sensing mode when compression of the compressible gap exceeds the threshold, the at least partial strain-sensing mode applying first different weights to values of the first signal and values of the second signal to estimate the force applied to the input surface; and
   operates in an at least partial pressure-sensing mode when compression of the compressible gap does not exceed the threshold, the at least partial pressure-sensing mode applying second different weights to values of the first signal and values of the second signal to estimate the force applied to the input surface.

2. The electronic device of claim 1, wherein the compressible gap is between the additional component and the force-sensing stack.

3. The electronic device of claim 1, wherein the pressure sensor comprises a capacitance-based pressure sensor.

4. The electronic device of claim 1, wherein the pressure sensor comprises a resistance-based pressure sensor.

5. The electronic device of claim 4, wherein the processing circuitry uses a common bridge configuration for measuring the first signal and the second signal.

6. The electronic device of claim 1, wherein the strain sensor and the pressure sensor are positioned in a common substrate layer within the force-sensing stack.

7. The electronic device of claim 1, wherein the pressure sensor is positioned below the strain sensor within the force-sensing stack.

8. The electronic device of claim 7, wherein the compressible gap is between the strain sensor and the pressure sensor.

9. The electronic device of claim 8, wherein the pressure sensor is positioned on the additional component and disposed toward the compressible gap.

10. An electronic device comprising:
a cover sheet defining an input surface;
a strain sensor coupled to the input surface;
a pressure sensor coupled to the input surface;
an additional component separate from the strain sensor and the pressure sensor and positioned below the input surface;
a compressible gap positioned between the additional component and the strain and pressure sensors; and
processing circuitry operably connected to the strain sensor and the pressure sensor;
wherein the processing circuitry is operable to:
receive a first signal from the strain sensor and a second signal from the pressure sensor;
determine, using at least one of the first signal and the second signal, whether compression of the compressible gap exceeds a threshold;
operate in an at least partial strain-sensing mode when compression of the compressible gap exceeds the threshold, the at least partial strain-sensing mode applying first different weights to values of the first signal and values of the second signal to estimate a force applied to the input surface; and
operate in an at least partial pressure-sensing mode when compression of the compressible gap does not exceed the threshold, the at least partial pressure-sensing mode applying second different weights to values of the first signal and values of the second signal to estimate the force applied to the input surface.

11. The electronic device of claim 10, wherein the strain sensor comprises a resistance-based strain sensor and the pressure sensor comprises a resistance-based pressure sensor.

12. The electronic device of claim 11, wherein the resistance-based pressure sensor comprises a current conductive material between two electrodes whose conductivity increases as the force applied to the input surface increases.

13. The electronic device of claim 10, wherein the pressure sensor is positioned below the strain sensor.

14. The electronic device of claim 13, wherein the processing circuitry determines that compression of the compressible gap does not exceed the threshold when the second signal from the pressure sensor is in a quiescent state.

15. The electronic device of claim 10, wherein the pressure sensor is positioned in a common substrate with the strain sensor.

16. The electronic device of claim 10, further comprising a housing, wherein:
the cover sheet is attached to the housing;
the housing defines a back side positioned opposite of the cover sheet;
the pressure sensor is positioned on the back side.

17. A method of estimating a force applied to an input surface of an electronic device, the method comprising:
receiving at a processing circuitry a first signal from a strain sensor linked with the input surface;
receiving at the processing circuitry a second signal from a pressure sensor;
using the second signal to determine whether a deflection of the input surface has exceeded a threshold;
when it is determined that the deflection has not exceeded the threshold, operating in an at least partial strain-sensing mode, the at least partial strain-sensing mode applying first different weights to values of the first signal and values of the second signal to estimate the force applied to the input surface;
when it is determined that the deflection has exceeded the threshold, operating in an at least partial pressure-sensing mode, the at least partial pressure-sensing mode applying second different weights to values of the first signal and values of the second signal to estimate the force applied to the input surface.

18. The method of claim 17, further comprising:
using a change in a first resistance within the strain sensor to produce the first signal;
using a change in a second resistance within the pressure sensor to produce the second signal; and
using a Wheatstone bridge structure that is operable to switch between the first signal and the second signal as part of estimating the force on the input surface.

19. The method of claim 17, further comprising:
determining that the first signal is within a range of values; and
using the first signal with the second signal to estimate the force applied to the input surface.

* * * * *